United States Patent [19]
Dimitroglou et al.

[11] Patent Number: 5,827,553
[45] Date of Patent: Oct. 27, 1998

[54] EDIBLE ADHESIVE

[75] Inventors: Dimitrios A. Dimitroglou, Attleboro, Mass.; Thomas A. Trezza, Concord, Calif.

[73] Assignee: Mantrose-Haeuser Co., Inc., Attleboro, Mass.

[21] Appl. No.: 799,531

[22] Filed: Feb. 13, 1997

Related U.S. Application Data

[63] Continuation of Ser. No. 568,325, Nov. 6, 1995, abandoned.

[51] Int. Cl.$^6$ .................................................. A23C 1/217
[52] U.S. Cl. .............................. 426/89; 426/93; 426/94; 426/96; 426/289; 426/292; 426/305; 426/560; 426/808; 426/658; 426/272
[58] Field of Search ................................. 426/89, 93, 94, 426/96, 289, 292, 305, 560, 808, 658, 272

[56] References Cited

U.S. PATENT DOCUMENTS

| | | | |
|---|---|---|---|
| 3,477,858 | 11/1969 | Wells et al. | 426/93 |
| 3,671,266 | 6/1972 | Cooper et al. | 426/93 |
| 3,806,613 | 4/1974 | Carroll et al. | 426/93 |
| 4,161,545 | 7/1979 | Green et al. | 426/93 |
| 4,279,932 | 7/1981 | Koshida et al. | 426/89 |
| 4,308,289 | 12/1981 | Huisman et al. | 426/274 |
| 4,363,825 | 12/1982 | Coker | 426/93 |
| 4,451,488 | 5/1984 | Cook et al. | 426/93 |
| 4,605,561 | 8/1986 | Lang | 426/93 |
| 4,692,342 | 9/1987 | Gannis et al. | 426/293 |
| 4,738,865 | 4/1988 | Morris | 426/658 |
| 4,767,635 | 8/1988 | Merritt et al. | 426/272 |
| 4,910,031 | 3/1990 | Budd et al. | 426/96 |
| 4,981,707 | 1/1991 | Morris | 426/93 |
| 5,085,877 | 2/1992 | Youcheff et al. | 426/100 |
| 5,298,268 | 3/1994 | Maegli | 426/93 |
| 5,470,600 | 11/1995 | Petelle et al. | 426/237 |
| 5,514,399 | 5/1996 | Cordera et al. | 426/295 |
| 5,688,845 | 11/1997 | Eden et al. | 524/48 |
| 5,698,252 | 12/1997 | Kelly et al. | 426/289 |
| 5,705,207 | 1/1998 | Cook et al. | 426/89 |
| 5,736,178 | 4/1998 | Cook et al. | 426/93 |

OTHER PUBLICATIONS

N–Tack, 2 page product sheet from National Starch and Chemical Company.

Trial Formula Adhesive Coating ("Gum") for Seasoned Dry Roasted Peanuts product sheet, one page, Grain Processing Corporation.

*Primary Examiner*—Cynthia L. Nessler
*Attorney, Agent, or Firm*—Calfee, Halter & Griswold LLP

[57] ABSTRACT

The present invention provides an oil-free, fat-free, edible adhesive for affixing seasoning to foods substrates which in its preferred embodiment is applied at room temperature. The edible adhesive comprises: from about 3% to about 60%, preferably 3% to about 28%, more preferably about 4.8 to about 9.8% of a starch hydrolysate having a dextrose equivalent of from about 4 to about 38, preferably about 10 to about 26, more preferably about 18; from about 3% to about 80%, preferably about 26% to about 75%, more preferably about 70% to about 75% of at alcohol having 1 to 4 hydroxyl groups, preferably 2 or 3 hydroxyl groups and 2 to 4 carbon atoms, preferably 3 carbon atoms; from about 0% to about 50%, preferably about 5% to about 30% more preferably about 10% of a polymerized glycol having a molecular weight of about 200 to 9,500, preferably about 200 to 900, more preferably about 400; and preferably a solvent. Preferably there is least about 5%, more preferably from about 5% to about 20%, even more preferably from about 5% to about 20%, most preferably 10% of a solvent, preferably water. The present invention also relates to methods for applying the edible adhesive and to the edible adhesive coated food substrate.

18 Claims, No Drawings

EDIBLE ADHESIVE

This application is a continuation of application Ser. No. 08/568,325 filed on Nov. 6, 1995, now abandoned.

BACKGROUND OF THE INVENTION

In the manufacture of various types of snack foods, such as cereals, crackers, potato chips, corn chips, corn curls and the like, it is conventional to add seasoning, such as spices after the product has already been formed. In the case of food products cooked in fat or oil, this is typically done by dusting the product with the spice, the residual fat or oil acting as an adhesive which binds the spice to the product. In other cases, the spice may be added by applying a coating composed of a fat or oil containing the spice to the already-formed product.

As a result of dietary concerns, efforts have been undertaken to replace the fat or oil used in this technique with other materials. At the present time, however, no suitable material has been found. For example, some proposed substitutes do not provide the desirable oily-type appearance of fats and oils. Other proposed substitutes introduce extraneous tastes, particularly, sweetness, colors, odors or undesirable visual effects. Still other proposed substitutes are difficult to apply, while still others have a high moisture content which is unacceptable in connection with water-sensitive foods, such as crispy snack foods. Many of these substitutes still contain fats or oils, albeit in reduced amounts.

Accordingly, there is a need for a new edible material which can be used for adhering spices to foods, particularly snack foods, which is easy to apply, which keeps the spice adhered to the food product, which provides a desirable oily-type appearance to the product and which does not introduce extraneous tastes, colors, odors or undesirable visual effects to the coated product.

SUMMARY OF THE INVENTION

The present invention provides an oil-free, fat-free, edible adhesive for affixing seasoning to food substrates which in its preferred embodiment is applied at ambient temperature. The edible adhesive comprises: from about 3% to about 60%, preferably 3% to about 28%, more preferably about 4.8 to about 9.8% of a starch hydrolysate having a dextrose equivalent of from about 4 to about 38, preferably about 10 to about 26, more preferably about 18; from about 3% to about 80%, preferably about 26% to about 75%, more preferably about 70% to about 75% of an alcohol having 1 to 4 hydroxyl groups, preferably 2 or 3 hydroxyl groups and 2 to 4 carbon atoms, preferably 3 carbon atoms; from about 0% to about 50%, preferably about 5% to about 30% more preferably about 10% of a polymerized glycol having a molecular weight of from about 200 to 9,500, preferably about 200 to 900, more preferably about 400; and preferably a solvent. Preferably there is least about 5%, more preferably from about 5% to about 20%, even more preferably from about 5% to about 20%, most preferably 10% of a solvent, preferably water.

The present invention also relates to methods for applying the edible adhesive and to the edible adhesive-coated food substrate.

DETAILED DESCRIPTION OF THE INVENTION

The present invention provides oil-free, fat-free, odorless, colorless, edible adhesive for affixing seasoning to food substrates, which may be applied at ambient temperature and has a water activity of less than 0.9, preferably less than 0.6, more preferably less than 0.5, most preferably about 0.43 at 23° C. Ambient temperature includes for example 15° to 30° C. To formulate a non-fat, non-oil edible adhesive, the requirement for a solvent to provide a viscosity suitable for application and to dissolve the ingredients must be balanced against the undesirable tendency of the food substrate to absorb the solvent.

The edible adhesive comprises: from about 3% to about 60%, preferably from about 3% to about 28%, most preferably about 4.8 to about 9.8% of a starch hydrolysate having a dextrose equivalence of from about 4 to about 38, preferably 10 to 26, most preferably about 18; from about 3% to about 80%, preferably about 26% to about 75%, more preferably from about 70% to about 75%, of an alcohol having 1 to 4 hydroxyl groups, preferably 2 or 3 hydroxyl groups and 2 to 4 carbon atoms, preferably 3 carbon atoms; from about 0% to about 50%, preferably about 5% to about 30% more preferably about 10% of a polymerized glycol having a molecular weight of from about 200 to 9,500, preferably about 200 to 900, more preferably about 400; and preferably a solvent. Preferably there is least about 5%, more preferably from about 5% to about 20%, even more preferably from about 5% to about 20%, most preferably 10% of a solvent, preferably water. The percentages expressed herein are by weight unless otherwise noted.

The amount of the edible adhesive to be applied to the food substrate depends upon the food substrate, the method of application, and the seasoning. Typically the amount of adhesive applied to the food substrate before evaporation of the solvent and the alcohol, is from about 1.5% to about 18%, preferably about 5% to about 12%, more preferably about 7% to about 8% of the weight of the coated food substrate. The amount of seasoning to be adhered to the edible adhesive depends upon the desired taste of the coated food substrate.

The present invention also relates to the edible adhesive coated food substrate and to methods for applying the edible adhesive. Where the seasoning has been combined with the adhesive prior to application to the food substrate, the present invention provides a flavored edible adhesive.

The edible adhesive at the time of application applied has 5% to 35% moisture, preferably about 5% to about 20%, most preferably 10%. However, after the edible adhesive is applied to the food substrate, the water and the alcohol, particularly propylene glycol will evaporate over time to provide a tasteless dried edible adhesive. Thus the dried edible adhesive when coated on the food substrate will have 0% to 35% moisture and 0% to 80% of the alcohol. Preferably, the pH of the edible adhesive is from about 5.0 to 6.7. The preferred embodiment of edible adhesive embodiment has a pH of about 5.6 to 6.2. The edible adhesive has the further advantages of being easy to prepare and easy to apply. The edible adhesive can be applied by spraying without heating or diluting the edible adhesive.

Starch Hydrolysate

The starch hydrolysates have a theoretical molecular weight of 400 to 4000, more preferably 900 to 1800, most preferably 1000; and a dextrose equivalence from 4 to 38, preferably 10 to 25, more preferably 15 to 20, most preferably 18. Dextrose equivalence is a measure of the extent of the starch polymer hydrolysis; it is defined as a reducing sugar content expressed as dextrose as percentage of dry weight. Preferably, the starch hydrolysate is soluble in water. Suitable starch hydrolysates include, for example, dextrins, maltodextrin, and corn syrups. Preferably, the starch hydrolysate is maltodextrin. Maltodextrin is a nonsweet, nutritive saccharide polymer having a dextrose equivalence of less that 20, and having the formula $(C_6H_{10}O_5)_n H_2O$. The polymerized units are D-glucose linked mainly by alpha 1–4 bonds. Maltodextrin is prepared by the partial hydrolysis of starch, preferably corn starch. The preferred maltodextrin has a theoretical molecular weight of about 1000 and a dextrose equivalence of 18. Suitable maltodextrins are commercially available under the tradenames Maltrin® M-180 and Maltrin® M-580 from Grain Processing Corporation. The Maltrin® M-180 is fine powder and the Maltrin® M-580 is agglomerated powder.

Solvent

Water, preferably, distilled water or soft water is present as a solvent. Other solvents for the starch hydrolysate are suitable, but less preferred.

The Alcohol

The alcohol is approved for human consumption, has 1 to 4 hydroxyl groups, preferably 2 or 3 hydroxyl groups and has about 2 to about 4 carbon atoms, preferably 3 carbon atoms. Suitable alcohols include glycerol, 1,3-butylene glycol and propylene glycol. The preferred glycol is propylene glycol, specifically 1,2-propane diol, having a boiling point of about 188° C., vapor pressure of 0.22 mmHg at 20° C.; a vapor density of 2.62; specific gravity 1.038 20/20° C., a flash point of 103° C. A suitable propylene glycol is available from Dow Chemical.

The Polymerized Glycol

A polymerized glycol, approved for human consumption, having a weight average molecular weight of 200 to 9500, preferably 200 to 900, most preferably 400, is optional, although preferably included in the edible adhesive. Preferably, the polymerized glycol is polyethylene glycol with a specific gravity of 1.12 at 25/25° C. and a flash point of 232° C. and a molecular weight of 400. A suitable polyethylene glycol is available under the trade name Polyglycol E-400 from Dow Chemical.

Optional Ingredients

Optionally, although preferably, an acidulant is used as an antimicrobial agent. Preferably, citric acid is used, more preferably, anhydrous citric acid is used. Optionally, preferably a preservative is used. Conventional preservatives are suitable, the preferred preservative is potassium sorbate. Other preservatives such as sorbic acid, benzoic acid and propionic acids or their salts are suitable, as well as alkyl esters of p-hydroxy-benzoic acid, also known as parabens, are suitable. Edible colorants are also added where desired. Sorbitol, and other sugar alcohols and other sweeteners are added to the edible adhesive particularly where a sweet food is desired.

Food Substrate

The adhesive is suitable for affixing seasonings on a variety of food substrates, including, for example, chips, pretzels, snack mixes, nuts, cereal, crackers and popcorn.

The Seasoning

As used herein, "seasoning" includes for example, herbs, spices, salt, sweeteners, cheese flavoring, colorants and other natural and artificial seasonings and flavorants. Preferably the seasoning is dry form.

Preparation of Edible Adhesive

Preferably, the acidulant and preservatives are added to the water and mixed thoroughly. Next, the starch hydrolysate is added and mixed until it is thoroughly dissolved. Optionally, the mixture may be heated to hasten the rate at which the starch hydrolysate is dissolved. The alcohol and the polymerized glycol are then added and blended. The resulting edible adhesive is a transparent, colorless, odorless solution.

Preferably, the viscosity is 40 to 70 cps, more preferably 50 cps, as measured using a No. 3 Spindle at 100 rpm on a Brookfield Viscometer, at about 25° C. While the edible adhesive is applied using any conventional means, the edible adhesive has the advantage of being sprayable at room temperature.

Application of Edible Adhesive

Conventional methods and equipment are used to apply the edible adhesive to the food substrate. A particular advantage of the edible adhesive is that it is sprayable at ambient temperatures, including, for example, 23° C. Preferably, the edible adhesive is sprayed onto the food substrate using conventional spray equipment which creates an atomizing air spray and is approved for use in food preparation, such as an automatic spray gun model 460 from Binks Manufacturing Company, Franklin Park Ill. Other methods of application are also suitable including, for example, brushing, dipping or ladling; the method of application depends upon the food substrate.

The edible adhesive is either mixed with the seasoning to provide a flavored edible adhesive, and then applied to the food substrate, or the adhesive is applied first to the food substrate and the seasoning is applied, such as by dusting or sprinkling. Multiple coats of seasoning may be applied if desired. Where the edible adhesive has been applied by spraying and the seasoning is not mixed with the edible adhesive prior to application, the edible adhesive is optionally sprayed a second time to the coated, seasoned food substrate.

Where the food substrate is at ambient temperature, a subsequent time drying step is often preferred to achieve the desired organoleptic properties, such as crispness. Good results have been obtained by a drying step in a conventional oven at about 40° C. for about 1–2 hours. However, where the food substrate temperature, such as at 100° C. or higher, is elevated at the time the adhesive is applied, a drying step is not preferred. The resulting coated food is crispy, and has an aesthetically pleasing sheen.

EXAMPLE 1

At ambient temperature in a glass beaker, 10%, that is, 400 g of water were added to the beaker. Next, 0.1%, that is, 4 g of anhydrous citric acid from Archer Daniel Midland Company and 0.1% that is, 4 g of potassium sorbate from Eastman Chemical Company, Kingsport Tenn. were added to the water and agitated thoroughly until the citric acid and potassium sorbate were dissolved. Next, 9.8% that is, 392 g of Maltrin® M-180 maltodextrin from Grain Processing Corporation in Muscatine, Iowa, having 18 dextrose equivalents was added to the mixture and mixed thoroughly until dissolved. Subsequently, 70% that is, 2800 g of propylene glycol from Dow Chemical of Midland Mich., and 10% that is, 400 g of polyglycol E-400, a polyethylene glycol from Dow Chemical of Midland, Mich., were added and mixed well until they were dissolved to provide a colorless, odorless edible adhesive, having a water activity of about 0.43 at 23° C., a pH of 5.6 to 6.2 depending upon the batch and typical density of about 1.08 kg/l or 9.0 lbs./gal. at 25° C.

The edible adhesive was loaded into a hand held sprayer from Preval Spray Gun from Precision Valve Corporation Yonkers, N.Y. and the spray was applied at 23° C., to 275 g low fat baked Tostitos® corn chip from Frito-Lay® The edible adhesive was not heated prior to or during application. Next, powdered Zesty Salsa Seasoning from Bush Boake Allen, Inc., Carrolton Tex. was applied to the edible adhesive coated corn chips by dusting. A second coat of edible adhesive was then sprayed onto a portion of the the corn chips. The corn chips were dried at about 40° C. for 1–2 hours. The resulting food products both with and without the second coat of edible adhesive, were crisp salsa flavored corn chips, with a slight pleasing sheen that was not tacky and did not agglomerate.

Also in a separate method of application, corn chips were heated in an oven set at either 160° C. for about 30 minutes or 100° C. for about 30 minutes. The chips were removed from the oven, control chips were set aside and received no further treatment. The edible adhesive was sprayed on the remaining chips, and the seasoning was dusted on the chips. Next the edible adhesive was again sprayed onto a sample of the corn chips; both the chips that received one coat of edible adhesive and two coats of the edible adhesive were crisp chips of the same crispness as the control chip. The seasoning adhered slightly more securely to the chips that received the second spray coat of edible adhesive.

EXAMPLE 2

An edible adhesive was prepared as in example 1, except that 4.8% rather than 9.8 maltodextrin was used and 75% rather than 70% propylene glycol was used. The resulting adhesive was easily sprayable at ambient temperature.

EXAMPLE 3

An edible adhesive was prepared as in Example 1 except that 30.73% water was used instead of 10%, 49.8% maltodextrin was used instead of 9.8%, 5% propylene glycol was used rather than 70%, no polyethylene glycol was used, and 14.27% of a 70% sorbitol solution, the sorbitol was obtained from Lonza Company, Fairlawn N.J. was added. The resulting adhesive was colorless, odorless and has a slightly sweet flavor. The resulting adhesive was not sprayable at ambient temperature and is thus less preferred.

EXAMPLE 4

An edible adhesive was prepared as in Example 3, except 27.4% maltodextrin was used rather than 49.8% and 27.4% propylene glycol was used instead of 5%. The resulting adhesive was colorless, odorless easily sprayed and has a slightly sweet flavor. The resulting adhesive was easily sprayable at ambient temperature.

Although certain embodiments of this invention have been shown and described, various adaptations and modifications can be made without departing from the scope of the invention as defined in the appended claims.

What is claimed is:

1. An edible food adhesive comprising:
   (a) about 3 to about 60% starch hydrolysate having a dextrose equivalent of from 4 to 38 and a molecular weight of about 400 to 4000;
   (b) about 26% to about 75% alcohol having from about 1 to 4 hydroxyl groups;
   (c) 0% to about 50% polymerized glycol having a weight average molecular weight of 200 to 9,500; and
   (d) a solvent;
   wherein the edible adhesive is fat free and oil free.

2. The edible food adhesive of claim 1 further comprising a preservative.

3. The edible food adhesive of claim 1 wherein there is:
   (a) about 3 to about 50% starch hydrolysate;
   (b) the alcohol has 2 to 4 carbon atoms;
   (c) about 5 to about 30% polymerized glycol; and
   (d) at least 5% solvent wherein the solvent is water.

4. The edible food adhesive of claim 1 wherein the alcohol is propylene glycol.

5. The edible food adhesive of claim 1, having a viscosity of from about 40 to about 70 cps.

6. The edible food adhesive of claim 1, having a water activity less than 0.9.

7. The edible food adhesive of claim 1, having a water activity less than 0.6.

8. The edible food adhesive of claim 1, having a water activity less than 0.5.

9. The edible food adhesive of claim 1 wherein the starch hydrolysate is maltodextrin.

10. A flavored edible adhesive comprising seasoning and the edible adhesive of claim 1.

11. The edible food adhesive of claim 1 wherein the polymerized glycol is polyethylene glycol.

12. The edible food adhesive of claim 11, wherein the polymerized glycol has a weight average molecular weight of about 200 to 900.

13. The edible food adhesive of claim 1 wherein the alcohol is propylene glycol, the polymerized glycol is polyethylene glycol having a molecular weight of about 400, the starch hydrolysate is maltodextrin having a dextrose equivalence of about 18, and a molecular weight of about 1000, and the solvent is water, wherein the water activity of the solvent is about 0.43.

14. The edible food adhesive of claim 13 wherein the propylene glycol is present in about 70%, the polyethylene glycol is present in about 10%, the maltodextrin is present in about 9.8%, and the water is present in about 10%.

15. The edible food adhesive of claim 13 wherein the propylene glycol is present in about 75%, the polyethylene glycol is present in about 10%, the maltodextrin is present in about 4.8%, and the water is present in about 10%.

16. The edible food adhesive of claim 13 wherein the propylene glycol is present in about 27.4%, the polyethylene glycol is present in about 0%, the maltodextrin is present in about 27.4%, the water is present in about 34.8%, and further comprising about 10% sorbitol.

17. The edible food adhesive of claim 13 further comprising an acidulant that is citric acid and the preservative potassium sorbate.

18. A flavored edible adhesive comprising seasoning and the edible adhesive of claim 13.

\* \* \* \* \*